US006256293B1

(12) United States Patent
Gerstel et al.

(10) Patent No.: US 6,256,293 B1
(45) Date of Patent: Jul. 3, 2001

(54) FAULT MANAGEMENT IN A MULTICHANNEL TRANSMISSION SYSTEM

(75) Inventors: Ornan Alexander Gerstel, Riverdale, NY (US); William Eric Hall, Clinton, CT (US); Rajiv Ramaswami, Ossining, NY (US); Galen Hajime Sasaki, Honolulu, HI (US)

(73) Assignee: Tellabs Operations, Inc., Lisle, IL (US)

( * ) Notice: Subject to any disclaimer, the term of this patent is extended or adjusted under 35 U.S.C. 154(b) by 0 days.

(21) Appl. No.: 09/039,665

(22) Filed: Mar. 16, 1998

Related U.S. Application Data

(63) Continuation of application No. 08/618,652, filed on Mar. 19, 1996, now Pat. No. 5,729,527.
(60) Provisional application No. 60/009,300, filed on Dec. 29, 1995.

(51) Int. Cl.$^7$ .................................................. G01R 31/08
(52) U.S. Cl. ............................................ 370/228; 370/216
(58) Field of Search ..................................... 370/216, 217, 370/218, 219, 220, 221, 225, 228, 242, 229, 252, 403

(56) References Cited

U.S. PATENT DOCUMENTS

| 4,056,687 | 11/1977 | Sims . | |
|---|---|---|---|
| 4,365,247 | 12/1982 | Bargeton et al. . | |
| 4,797,874 | 1/1989 | Chahabadi et al. . | |
| 4,993,019 | 2/1991 | Cole et al. . | |
| 5,113,391 | 5/1992 | Gupta et al. . | |
| 5,214,692 | 5/1993 | Chack et al. . | |
| 5,313,456 | 5/1994 | Sugawara . | |
| 5,321,394 | * | 6/1994 | Carlton ................................. 370/220 |
| 5,331,631 | * | 7/1994 | Teraslinna ............................ 370/392 |
| 5,434,691 | * | 7/1995 | Yamane ................................ 370/228 |
| 5,901,024 | * | 5/1999 | Deschaine ............................ 370/228 |

FOREIGN PATENT DOCUMENTS

| 3633057 A1 | 3/1988 | (DE) . |
|---|---|---|
| 0 437 198 A1 | 1/1991 | (EP) . |

* cited by examiner

*Primary Examiner*—Douglas Olms
*Assistant Examiner*—Ricardo M. Pizarro
(74) *Attorney, Agent, or Firm*—McAndrews, Held & Malloy, Ltd.

(57) ABSTRACT

Efficient methods for rerouting failed channels on to spare channels in a multichannel transmission system are described. One method uses a minimal amount of rerouting to reroute all the channels if one or two line cards fail.

Another set of methods reroute up to two failed channels on to spare channels in the event of channel failures. With this method only the failed channels are rerouted. However the failed channels may have to be routed through a slightly larger, but minimal, number of additional hops than with the first method.

23 Claims, 14 Drawing Sheets

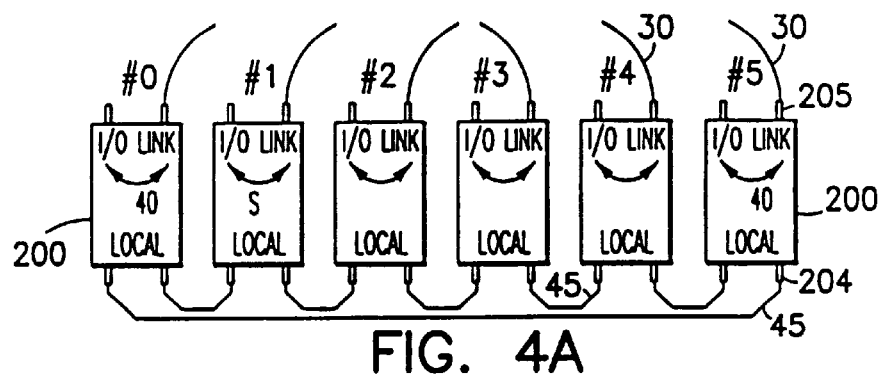
FIG. 4A
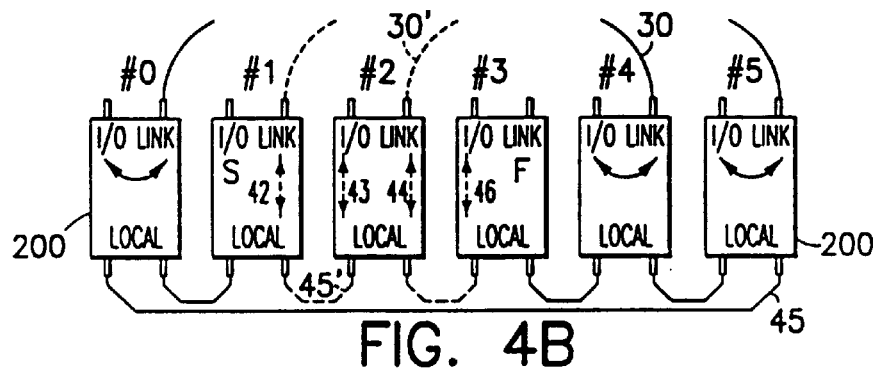
FIG. 4B
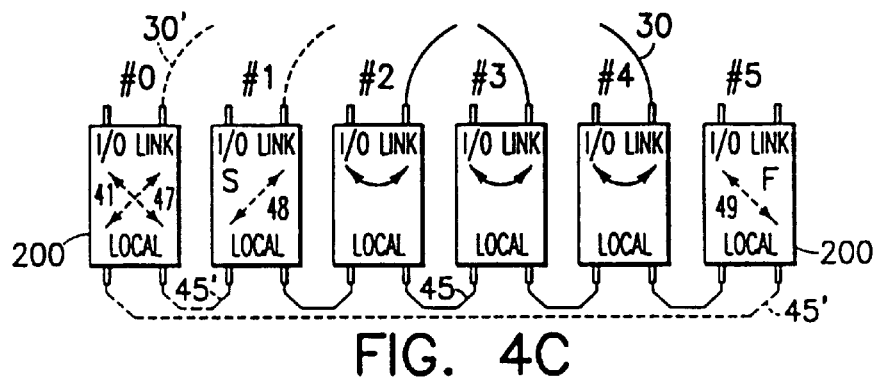
FIG. 4C
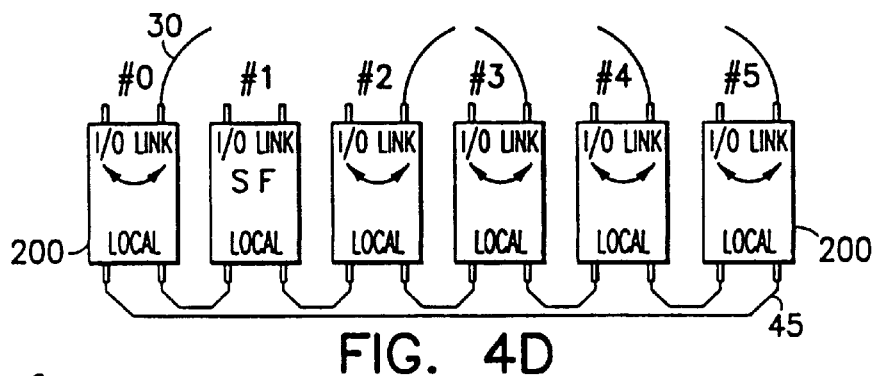
FIG. 4D
FIG. 4

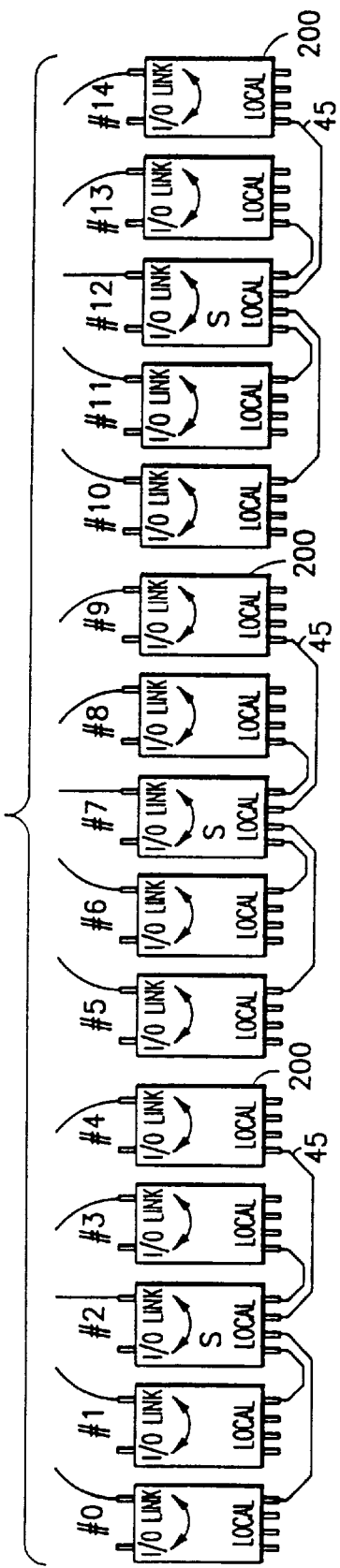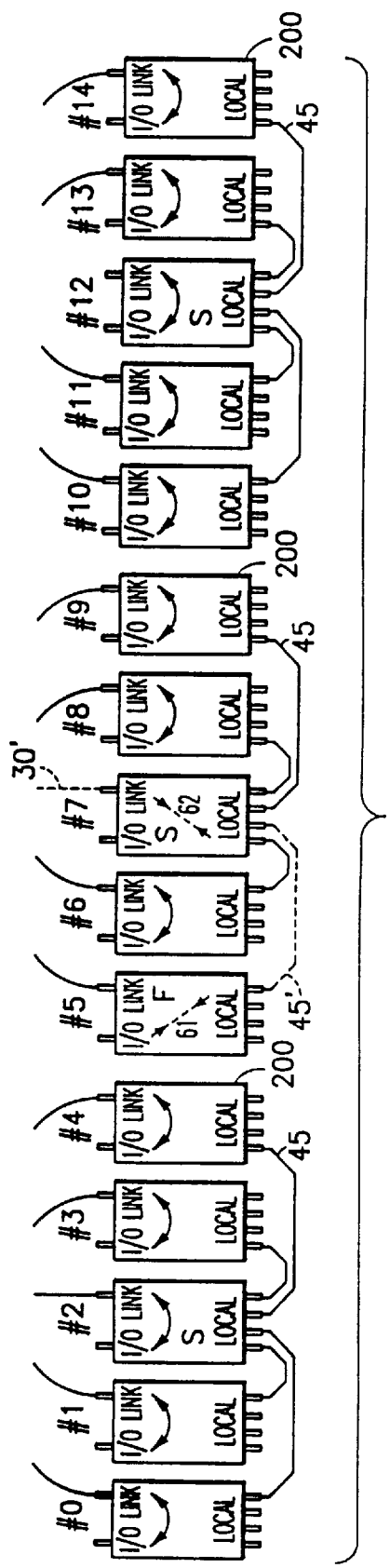
FIG. 6A  FIG. 6B
FIG. 6

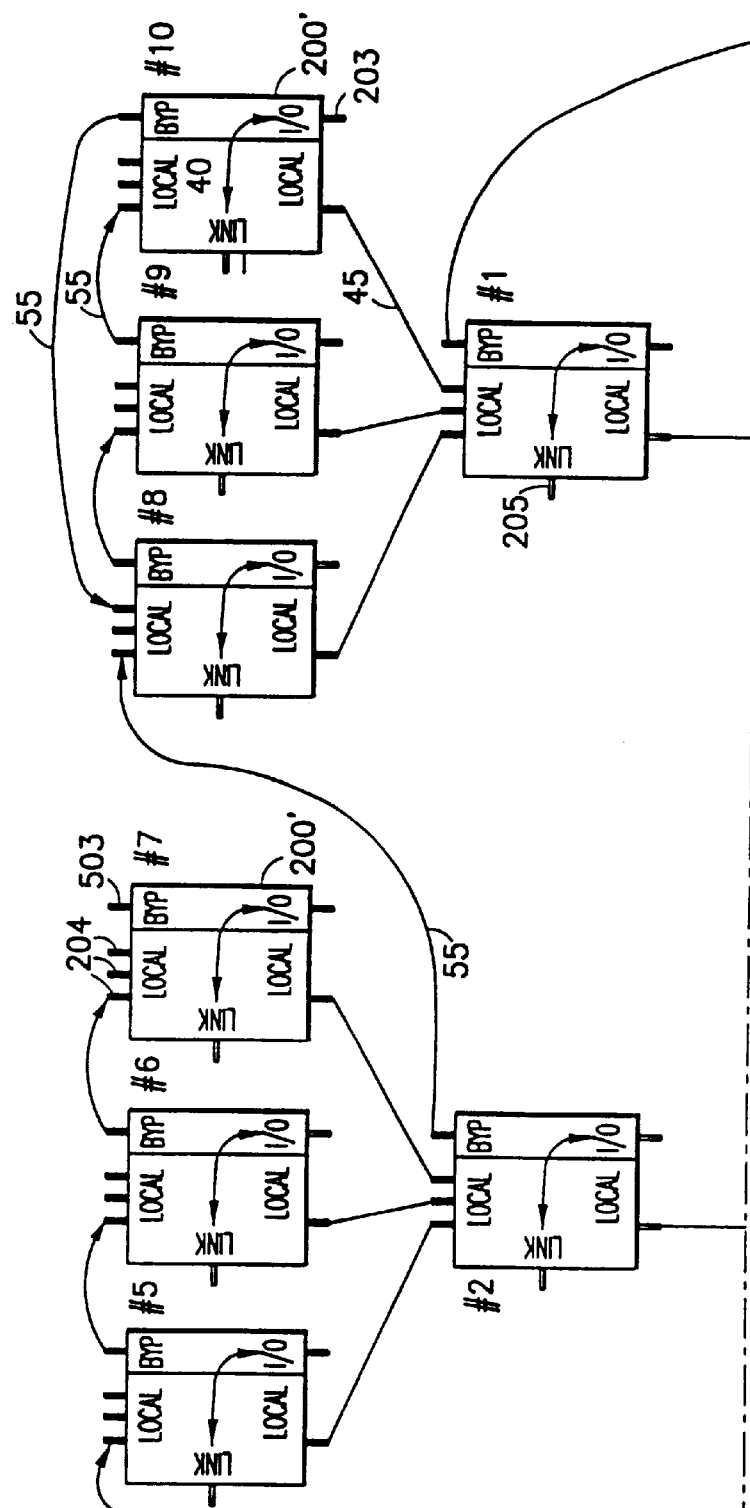

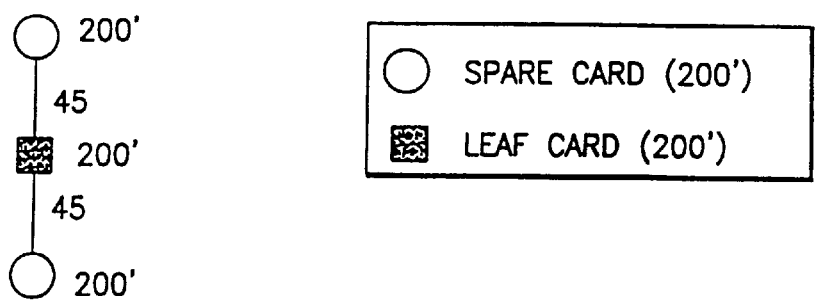
FIG. 10A
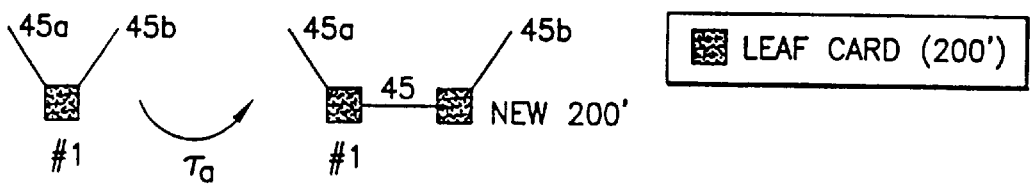
FIG. 10B
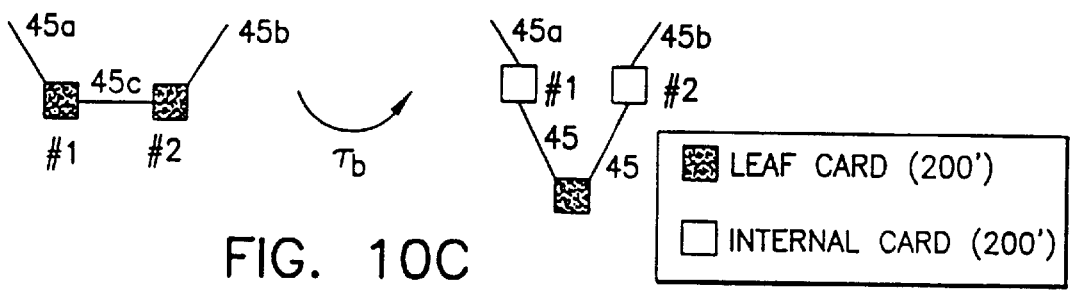
FIG. 10C
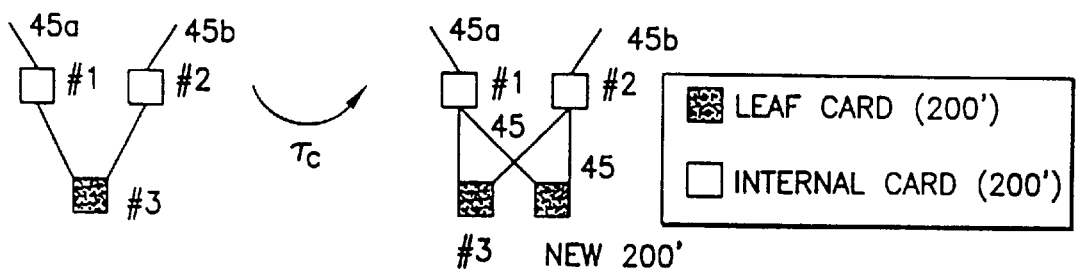
FIG. 10D
FIG. 10

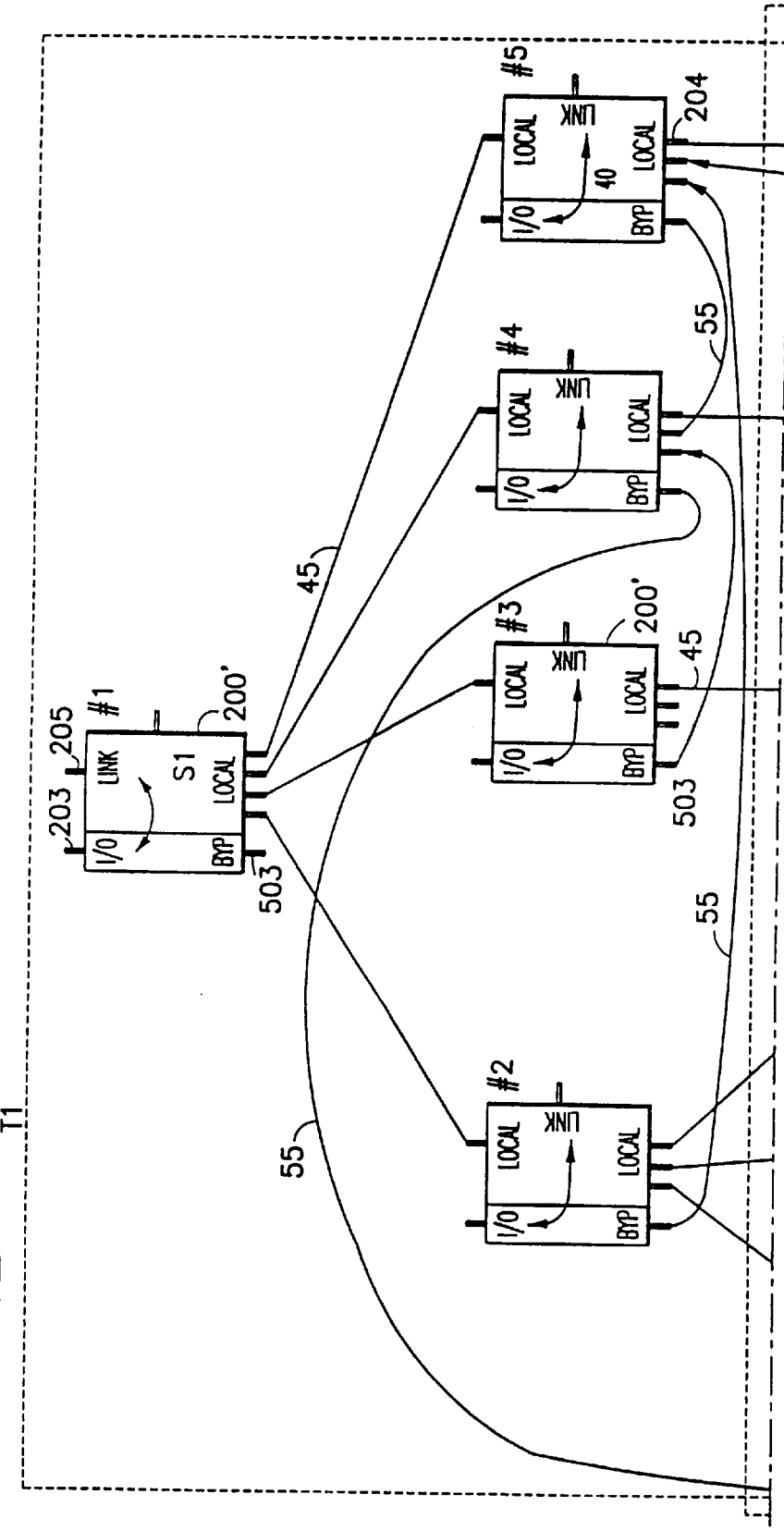

FAULT MANAGEMENT IN A MULTICHANNEL TRANSMISSION SYSTEM

CROSS-REFERENCE TO RELATED APPLICATIONS

This application is a continuation of application Ser. No. 08/618,652, filed Mar. 19, 1996, entitled Fault Management in a Multichannel Transmission System now U.S. Pat. No. 5,729,527, which takes benefit of Provisional Application No. 60/009,300, filed Dec. 29, 1995.

TECHNICAL FIELD

The present invention relates generally to point-to-point transmission links employing multiple channels. More specifically, it relates to providing fault tolerance on optical wavelength-division-multiplexed multichannel links.

DESCRIPTION OF THE PRIOR ART

A multichannel link comprises a number of channels, say N, between two sites. These channels may be transmitted separately (for example over parallel wires or fiber cables) or multiplexed on to one or a small number of wires or fibers using time or wavelength division multiplexing. Usually these links are realized in the form of line cards, one for each channel. A line card can be any device that provides an interface between the I/O for the channel and the transmission medium. Line cards may fail. In many applications it may be desirable to reroute inputs/outputs (I/Os) of failed line cards on to other line cards (or channels).

One example is the IBM MuxMaster system [1]. This system multiplexes up to ten full-duplex channels on to a single transmission link. Typically, fault management is done by having a fully redundant configuration [2]. For each operating link with 10 channels, an additional link with 10 channels is used as a backup. Switching is provided outside the system so that if a card (channel) on the operating link fails, the I/O for that card is switched to the card on the backup link. However this is an expensive solution since it doubles the hardware needed. In cases where the failure of cards is rare and it is unlikely that more than a few cards fail at any given time, it is desirable to minimize the number of additional spare cards.

U.S. Pat. No. 5,313,456 "Data Link Protecting System"

This patent considers a transmission system comprising of two ends A and B with N transmission lines between them. Each transmission line can carry data signals and an additional low-speed control signal. At any given time there is one control signal that is carried on one of the N transmission lines. At each end A and B this control signal is connected via a 1×N switch to any of the N transmission lines. If the current transmission line fails, the patent teaches how to then switch the control signal onto another unused transmission line using the 1×N switches. Thus this patent provides for rerouting 1 input signal to a spare transmission line in the event of a failure using two 1×N switches. This patent requires complex and expensive 1×N switching components when N is large (e.g., N=100).

U.S. Pat. No. 5,434,691 "Communications System Having Optical Transmission Line . . . "

This patent provides for rerouting inputs on a failed transmission channel to a spare channel, like the present invention but uses more inefficient methods. The first method taught assumes a 1×N switch on the spare line card which is connected to each of N other line cards. If one of the latter line cards fails the input of that card is then routed on to the spare transmission channel. This patent requires complex and expensive 1×N switching components when N is large (e.g., N=100). The second and third methods taught in this patent connect the link cards in a line or ring network, wherein card i is connected to i−1 and i+1, as in our invention. If a card fails, its input is rerouted through the network to the spare card without affecting the other channels. In the worst case this can take up to N additional "hops", since the input may have to be routed through N−1 other cards before it reaches the spare card. Such a large number of hops can adversely impact signal quality.

U.S. Pat. No. 4,365,247 "End Station Digital Transmission Link Relieving System"

This patent essentially teaches a specific implementation of the first method of U.S. Pat. No. 5,434,691 wherein a 1×N switch is used on the spare line card to connect it directly to the N other link cards. Again, this patent requires complex and expensive 1×N switching components when N is large (e.g., N=100).

U.S. Pat. No. 5,113,391 "Intelligent Channel Unit"

This patent teaches cascading "intelligent channel units" (ICUs) so that ICU i is connected to ICU i−1 and ICU i+1. If ICU i fails, the patent teaches a method to bypass ICU i so that ICU i−1 can be directly connected to ICU i+1, while ICU i is repaired. Here, the I/O of ICU (line card) i is lost. This patent does not teach how to connect link cards so that if two cards i and j fail simultaneously, they can both be routed to different designated spare cards.

U.S. Pat. No. 5,214,692 "Bypass for Telephone Switching System"

This patent considers a system wherein N digital lines arrive and pass through a "main distribution frame" (MDF) to a "automatic call distributor" (ACD) which contains a N×N switch that connects each digital line to a digital telephone at the output of the switch. In the event of the switch in the ACD failing, the patent teaches two techniques (a) to have each digital telephone connected directly to a digital line (no switching capability provided) bypassing the failed switch, or (b) the digital telephones are connected to another switch in the MDF which is used to connect them to the digital lines if the switch in the ACD fails. This patent does not thus teach the idea of having line cards (or other entities) connected together so that if one or two of these entities fails their inputs can be routed to designated spare cards.

U.S. Pat. No. 5,331,631 "N+K Sparing in a telecommunications Switching Environment"

This patent teaches how to provide fault-tolerance within a multistage packet-switched interconnection network. It does not teach how to reroute inputs on failed line cards to other spare cards using limited switching and small number of additional hops.

SUMMARY OF THE INVENTION

The present invention describes methods for rerouting channels on failed line cards to spare line cards. It uses very limited switching in combination with carefully designed interconnection patterns to achieve rerouting of multiple failed channels to spare line cards by going through a minimal number of additional switching components. The invention provides some switching in the line cards to allow rerouting of the I/O channels in the event of line cards failing. While this invention is applicable to any multichannel system, it has particular advantages when using wavelength division multiplexing, where the number of channels per fiber is not very large and the probability for a line card to fail is relatively high.

Two types of rerouting are considered: (1) where we are allowed to reroute all I/Os in the event of a line card failure (full rerouting), and (2) where we are allowed to reroute only the I/O corresponding to the failed lie card (limited rerouting).

Two different types of switching arrangements are considered. In the first arrangement, referred to as limited switching, each line card is provided with a switch that interconnects the I/O either to the link port (for transmission on the link) or to one of k other local ports. It is also possible to interconnect a local port with the link port. Each port can be interconnected with only one other port at any given time. Local ports of different line cards may be "hardwired" together. The term "wire" shall refer to any physical connection such as a copper wire of optical fiber between two elements being "hardwired" to each other. This allows an I/O of a line card to be switched to the I/Os and link ports of other line cards.

With the first arrangement one line card is designated as a spare card. If another line card fails then the invention proposes a method to reroute all the I/Os on to other channels (full rerouting). Each I/O is routed through only one additional line card. The number of additional cards (or "hops") a signal is routed through is important since the degradation in signal quality is approximately proportional to this number. Thus this rerouting method minimizes the degradation in signal quality. A similar method is proposed for the case of two line card failures.

For the limited rerouting case the invention proposes to use one spare card for each group of k line cards and allows the I/O of a failed line card to be routed directly to a spare line card, or again one additional hop.

In the second arrangement, referred to as crossbar switching the invention provides a higher-degree of switching in the line card. Specifically, each line card is provided with a crossbar switch that can realize any permutation of its k local ports, link port and an inside port. It is provided with an additional switch that under normal operation connects the I/O signal to the inside port but under a failure, connects the I/O to a separate bypass port. Local ports and bypass ports of different cards may be "hardwired" together. This allows an I/O to be switched to other line cards if its associated line card fails.

With the second arrangement the invention provides methods for limited rerouting in the case of one or two line-card failures. In each case it provides a method for rerouting only the failed I/Os on to spare cards going through approximately log N line cards, N being the total number of channels. While this results in a poorer signal quality compared to the limited-switching arrangement, it allows the number of spares to be kept small, allows the failed line card to be removed for servicing without bringing down that I/O channel, and does not affect all the other channels if a channel fails.

BRIEF DESCRIPTION OF THE DRAWINGS

FIG. 4 shows the wiring of the link cards for full rerouting in the case N=6 and various changes in the configuration in case of a single failure.

FIG. 6 shows the wiring of the link cards for limited rerouting using limited switching, in a group for the case N=5, and the configuration after a fault.

FIG. 10 shows an initial configuration and transformations for larger configurations for the wiring of link cards for the case of limited rerouting to two spare cards and crossbar switching.

DESCRIPTION OF THE PREFERRED EMBODIMENT

Figure 1:
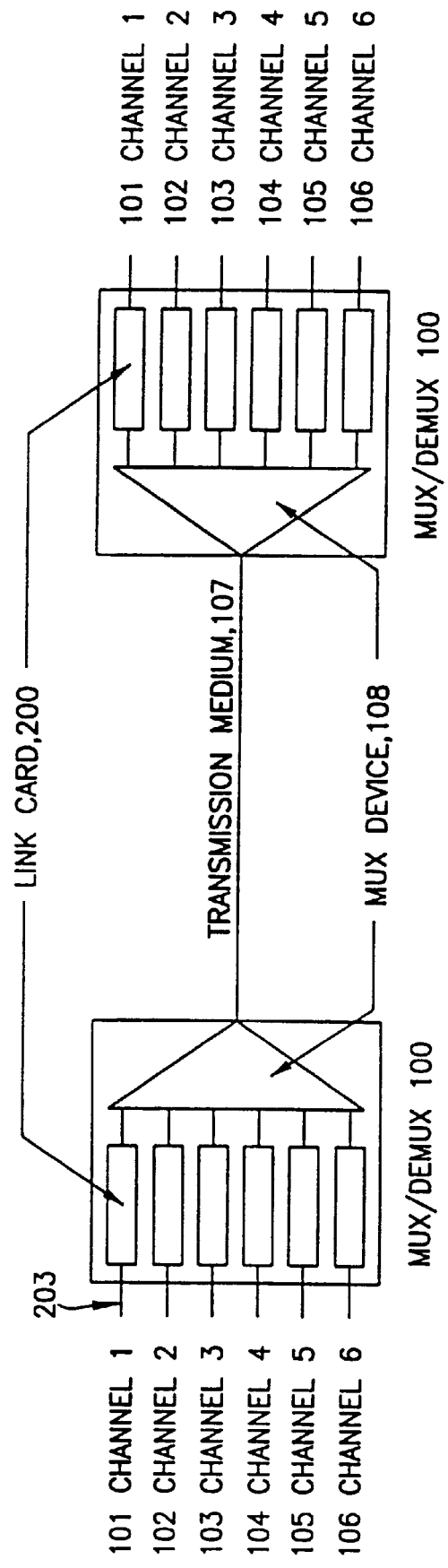
FIG. 1 shows the block diagram of a multichannel transmission system.

FIG. 1 shows the block diagram of a multichannel transmission system. It consists of a multiplexer/demultiplexer (mux/demux) unit 100 at each end of the transmission link 107 with 6 channels 101–106 (N channels in general), a line card 200 for each channel, and a mux/demux device 108 that physically merges/separates the channels onto the link in this embodiment. Other embodiments may not require a mux/demux device if no multiplexing is done on the transmission medium.

Figure 2:
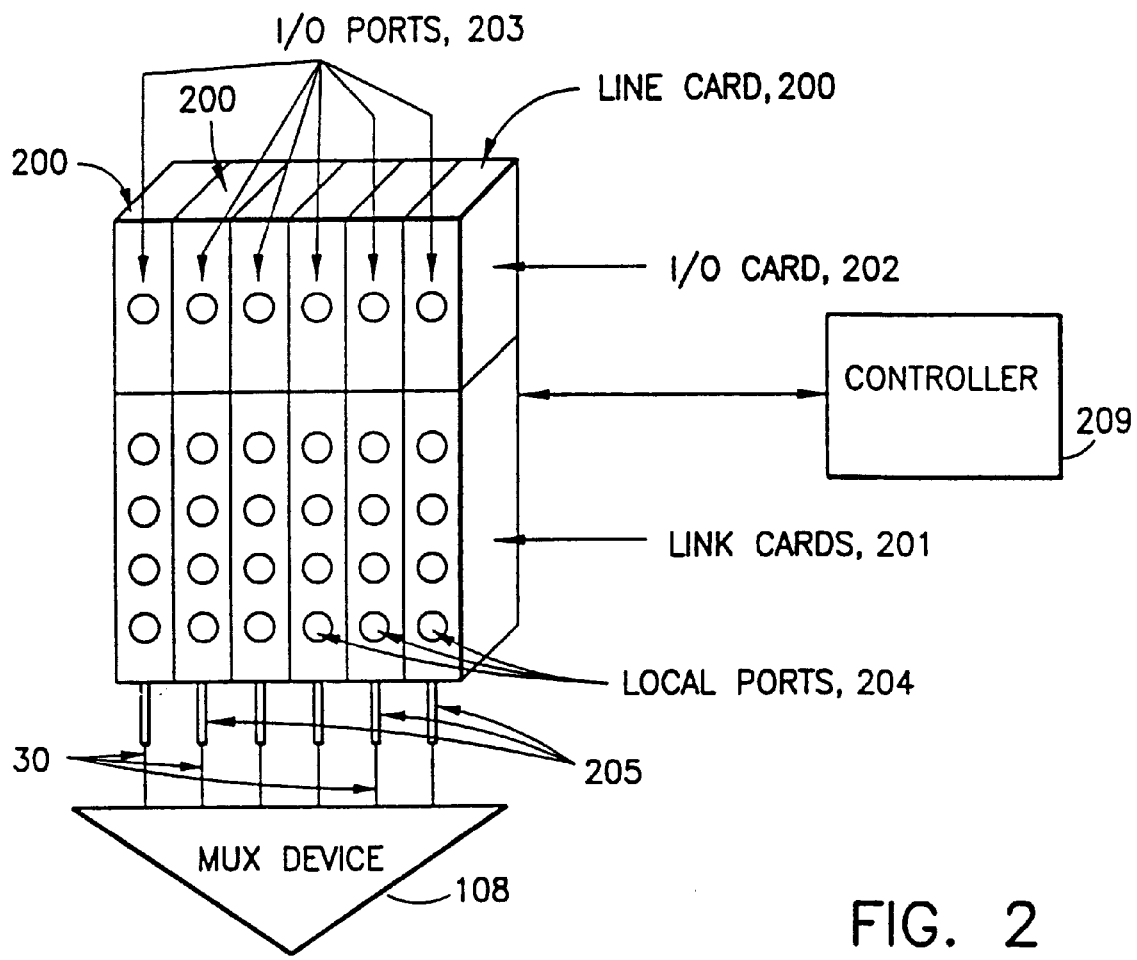
FIG. 2 shows a more detailed diagram of a mux/demux unit.

FIG. 2 shows a more detailed diagram of a mux/demux unit 100. It consists of N line cards 200 (N=6 in this example). In the embodiment, each line card is actually realized by using a pair of cards: a link card 201 and an I/O card 202. The multiplexing/demultiplexing and transmission hardware is found on the link cards, and the I/O cards simply receive the input/output signals and route them to the link cards. Thus, link cards are more prone to failures than I/O cards. Other realizations may combine the functionality of both cards into one card. Each I/O card 202 has an I/O port 203 to which the external input/output is connected. Each link card has a number of local ports 204 and a link port 205 for connecting it to the transmission link via wire 30 and a mux/demux device 108. A controller 209 is connected to all of said line cards and is based on any processor, e.g., Pentium.

This invention describes a wiring scheme that supports switching of I/O from failed to spare line cards. The control mechanism required to detect a failure and to implement the desired configuration changes is based on standard methods. See reference [3] which is hereby incorporated herein by reference. Thus, detection of a failing line card can be done by detecting the loss of light from the link port 205, this failure and others are signaled to the controller 209, which, in turn, computes the required change in the configuration, based on its knowledge of the current state of each of the components in the unit. The controller then signals the switches in each line card a request to change their state and updates its view of the state of the unit.

Limited Switching

Figure 3:
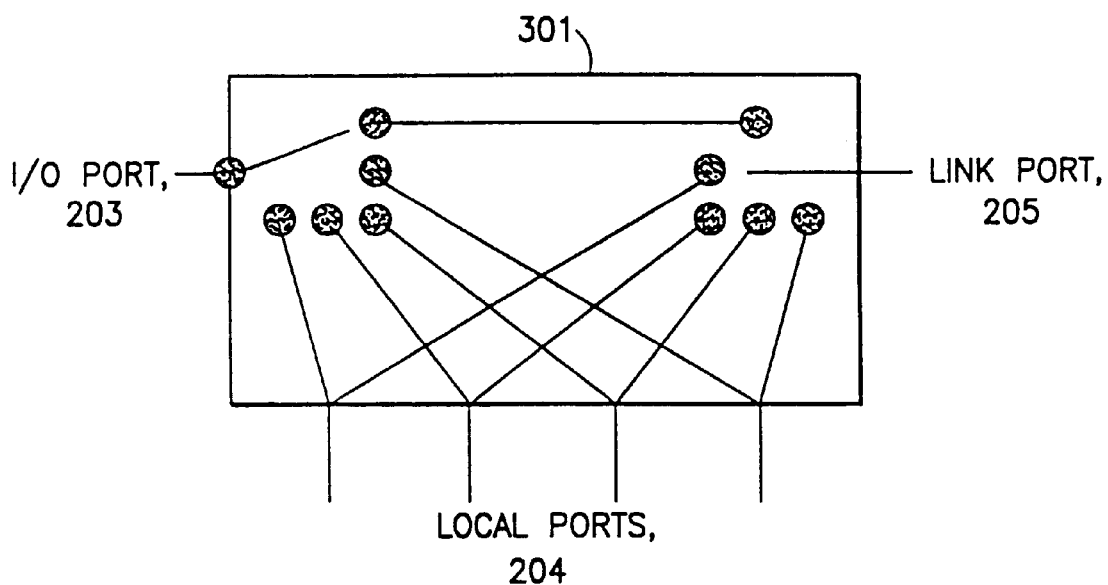
FIG. 3 shows the switching arrangement present in a line card for the case of limited switching.

FIG. 3 shows the switching arrangement present in a line card 200. The switch component 301 interconnects the I/O port 203 to either the link port 205 for transmission on the link, or on to one of four local ports (204) (k local ports in general). The switch can also interconnect the link port either to the I/O port or on to one of the local ports. Here, N>k+1, where switch component 301 has two 1×(k+1) switches.

Full Rerouting

Single Failure:

Referring to FIG. 4A, under normal operation all N line cards 200 (and channels) can be used. For the sake of discussion, number the line cards (and corresponding I/Os) from 0 to N−1. More specifically, for N=6, the line cards 200 are numbered from 0 to 5 as shown. At least one line card s (line card #1) is considered a spare, i.e., its I/O can be discarded. In case of a single line card failure, the goal is to reroute N−1 I/Os (other than the I/O s port of) to the link ports of the remaining line cards (#'s 0, and 2–5).

This can be done using the following configuration with k=2. Each line card z has its local ports hardwired to a local port of line card (i−1) mod N and a local port of line card (i+1) mod N (See 45 of FIG. 4A). FIG. 4A shows the wiring of the link cards for the case N=6. Link card 0 is hardwired to link card 1 and 5, link card 1 to link card 0 and 2 etc. The switches 301 are set as shown in 40 the figure, with each I/O being interconnected to its corresponding link port. Also shown are links 30 out of the link ports 205.

Referring to FIG. 4B, in case of a single line card failure, say at line card f (#3 in FIG. 4B), successful rerouting can be accomplished using one of the following two algorithms. The following notation will be used:

$$[x, y] = \begin{cases} \{x, x+1, \ldots, y-1\}, & \text{if } x < y; \\ \{x, x+1, \ldots, N-1, 0, 1, \ldots, y-1\}, & \text{if } x > y; \\ \phi, & \text{if } x = y. \end{cases}$$

Spar-to-failed rerouting from s to f: For i∈[s, f), have I/O (i+1) mod N be switched to the link port of line card i.

Failed-to-spare rerouting from f to s: For i∈[f, s), have I/O i be switched to the link port of line card (i+1) mod N.

Note that for both rerouting algorithms, if s=f then no rerouting takes place.

EXAMPLE 1

Suppose that link card 1 in FIG. 4A is designated as the spare card and link card 3 fails. Then we do either spare-to-failed rerouting from 1 to 3, or failed-to-spare rerouting from 3 to 1.

FIG. 4B illustrates spare-to-failed rerouting from 1 to 3. I/O port of line card #3 is switched to link port 2 (See 44 and 46 of line cards #2 and #3, respectively), and I/O port of line card #2 is interconnected to the link port of spare line card #1. See 42–43.

FIG. 4C illustrates failed-to-spare rerouting from line card #5 to #1. The I/O port of line card #5 is switched to the link port of line card #0 (See 49, 45', 47) and I/O #0 to link port #1 (See 41).

Suppose link card 1 fails. Then no rerouting is done, as shown in FIG. 4D.

Figure 5A:
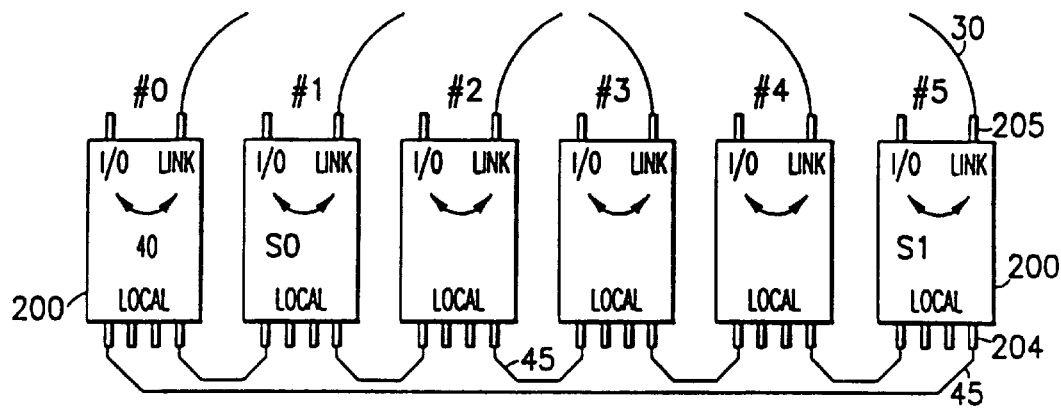
FIG. 5 shows the wiring of the link cards for full rerouting in the case N=6 and the configuration in case of two failures.
Figure 5B:
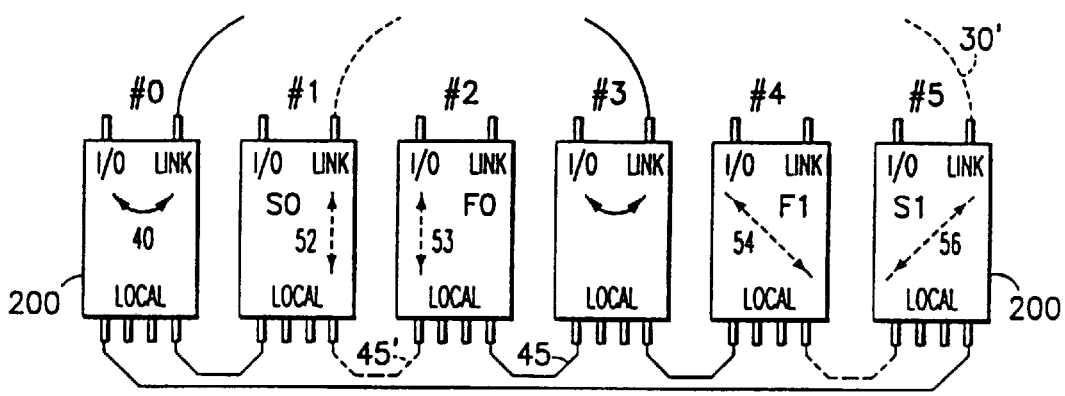
Figures 5, 5C:
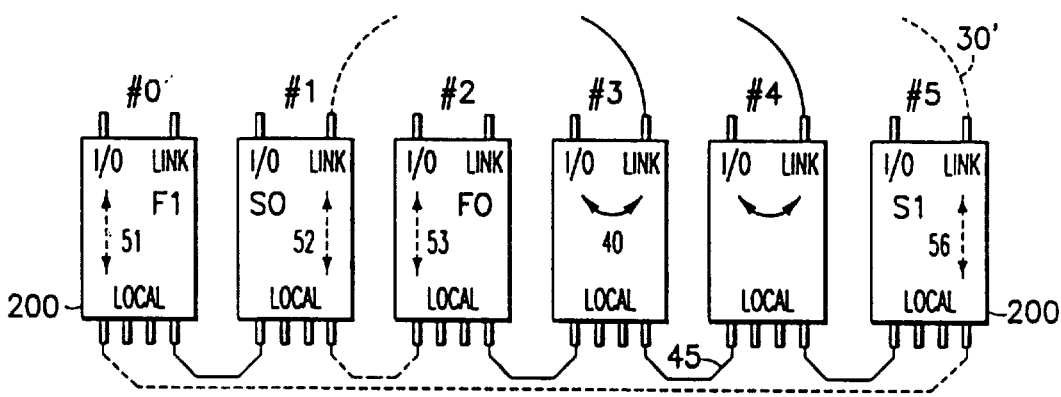

Two Failures:

Referring to FIG. 5 this is similar to the case above except that there are at least two spare line cards, $s_0$ and $s_1$. In case of two line card failures, the goal is to reroute N−2 I/Os (other than spare I/O ports $s_0$ and $s_1$) to the link ports of the remaining line cards. If there is no failure, the wiring is shown in FIG. 5A, and is identical to the wiring of FIG. 4A.

Let the two failures be at line cards $f_0$ and $f_1$. Scan the line cards starting at so towards line card #N, and continue from line card #0 to #$s_0$−1. Note that without loss of generality, only two cases need to be considered: Case 1 (see FIG. 5B) is when after so, $f_0$ is met by the scanning process, then $f_1$ and then $s_1$. Case 2 (see FIG. 5C) is when $f_0$ is met first, then $s_1$ and only then $f_1$.

The following algorithm successfully reroutes the I/O ports. For Case 1, spare-to-failed rerouting from $s_0$ to $f_0$ is done, and failed-to-spare rerouting from $f_1$ to $s_1$ is done. For Case 2, spare-to-failed rerouting from $s_0$ to $f_0$ and then from $s_1$ to $f_1$ is done. (Note that the rerouting for Case 2 can be simplified if $f_0=s_1$. Then failed-to-spare rerouting from $f_1$ to $s_0$ is sufficient.)

EXAMPLE 2

Referring to FIG. 5B, suppose line cards #1 and #5 are designated spare cards. Suppose also cards #2 and #4 fail. This corresponds to Case 1 above, with $s_0=1$, $f_0=2$, $f_1=4$, and $s_1=5$. The I/O port of line #2 is switched to link port of line card #1 (See 53, 45' and 52). The I/O port of line card #4 to link 5 (see 54, 45', and 56).

Referring to FIG. 5C, suppose instead that cards #0 and #2 fail. This corresponds to Case 2 above, with $s_0=1$, $f_0=2$, $s_1=5$ and $f_1=0$. The I/O port of line #2 is switched to link port of line card #1 (See 53, 45', and 52), and the I/O port of line card #0 to link port of line card #5 (See 51,45', and 57).

Limited Rerouting

With limited rerouting if line card i fails, only I/O i needs to be rerouted. Let there be at least ⌈N/(k+1)⌉ spare line cards.

We propose the following configuration, illustrated in FIG. 6. Partition the line cards into groups of size at most k+1 such that each group has at least one spare. This is possible since there are at least ⌈N/(k+1)⌉ spares. For each line card that is not a spare, wire one of its local ports to a local port of a spare in its group (See 45). This wiring is possible since the group sizes are at most k+1 and there are k local ports on a line card. FIG. 6A illustrates this configuration for the case N=15 and k=4.

If a line card fails, its I/O is rerouted to the link port of its spare. For example, in FIG. 6B line card #5 fails and its I/O is routed to link 30' of card #7 on the spare via 61, 45' and 62.

Crossbar Switching

Figure 7:
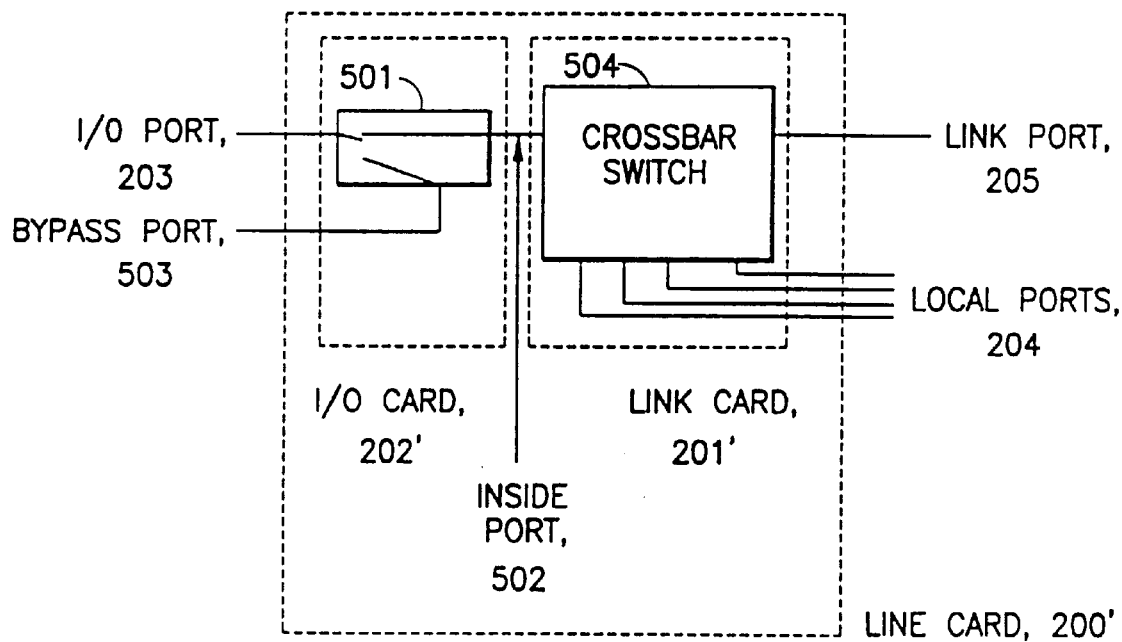
FIG. 7 shows the switching arrangement present in a line card and its associated I/O card for the case of crossbar switching.

FIG. 7 shows the second switching arrangement, present in a line card 200' (i.e., a link card 201' and its associated I/O card 202'). The bypass switch 501 on the I/O card interconnects the I/O port 203 to either the inside port 502 or the bypass port 503. The crossbar switch 504 on the link card provides full permutation connectivity of the inside port 502, the link port 205 and the 4 local ports 204 (k local ports in general).

We use the following conventions in the figures: A wire between two local ports will be designated the number 45 (drawn as a solid line) during the normal operation of the system, and 45' (drawn as a dashed line) if it is used to reroute the I/O of a failing line card to a spare. A wire between a bypass port to a local port will be designated 55 in the figures (drawn as a solid arrow from the bypass to the local port), in the normal operation mode and 55' (drawn as a dashed arrow) if it is used by the failing card for rerouting. The enabled data paths in a switch will be designated the number 40 (drawn an a solid two-way arrow) in the normal mode and 40' (dashed two-way arrow) if used as part of a route from a failed line card to a spare. These designations will change whenever a specific reference is required.

We propose two configurations to interconnect the cards to deal with failures. For each configuration we give algorithms to reroute the I/O of the failed card(s) onto the spare card.

The first is a tree configuration. This handles failure of one line card and uses a minimum hop route to reroute a failed channel. The second is a dual tree configuration. This handles two line card failures but uses slightly longer routes to reroute failed channels.

Single Failure—Tree Configuration

Figure 8B:
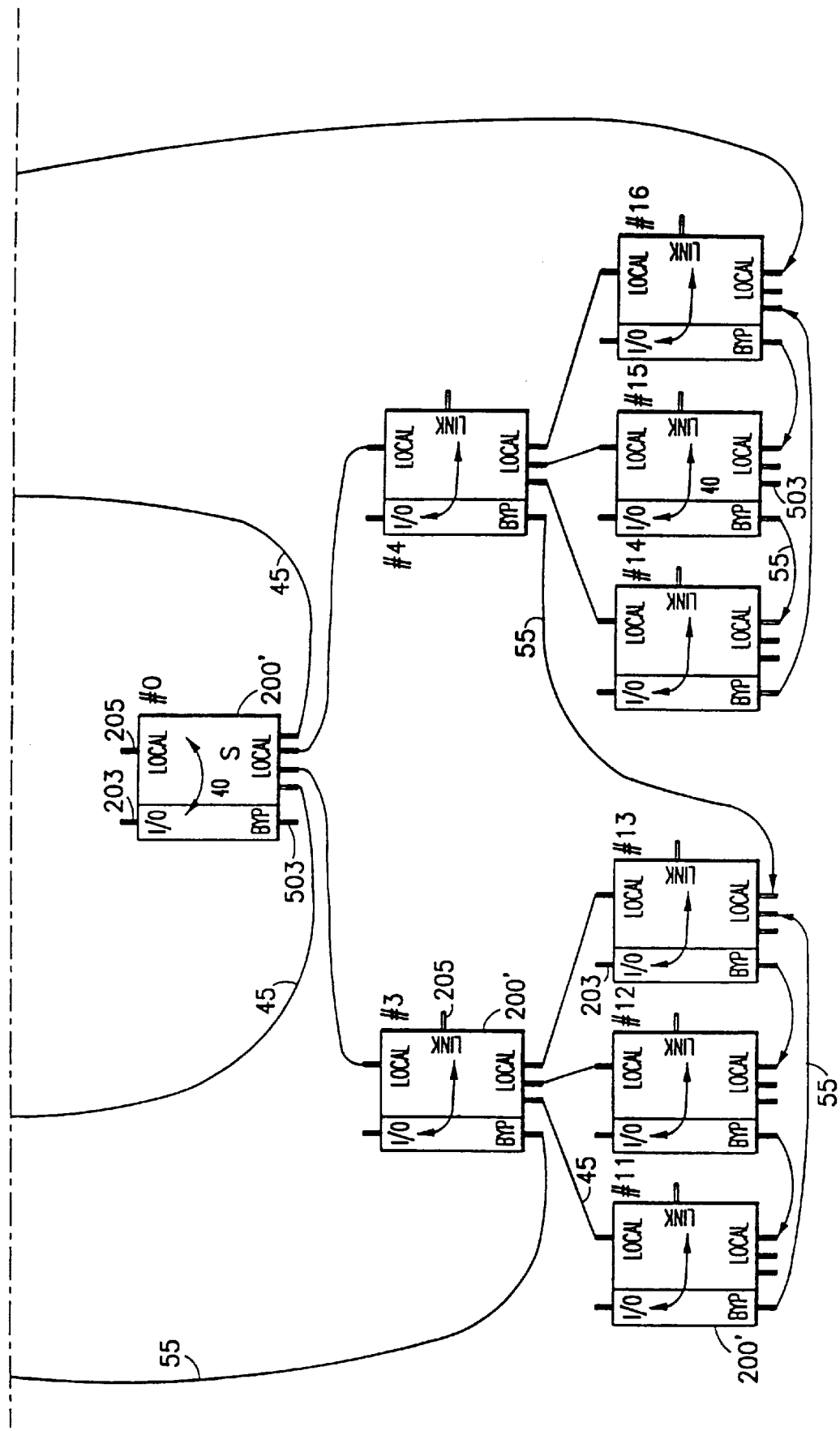
FIG. 8 shows a tree configuration for wiring the line cards using crossbar switching, in an N=17 channel system with k=4 local ports on each link card. The undirected lines indicate wires between two local ports and a directed line indicates a wire from a bypass port to a local port.
Figures 9, 9A, 9B:
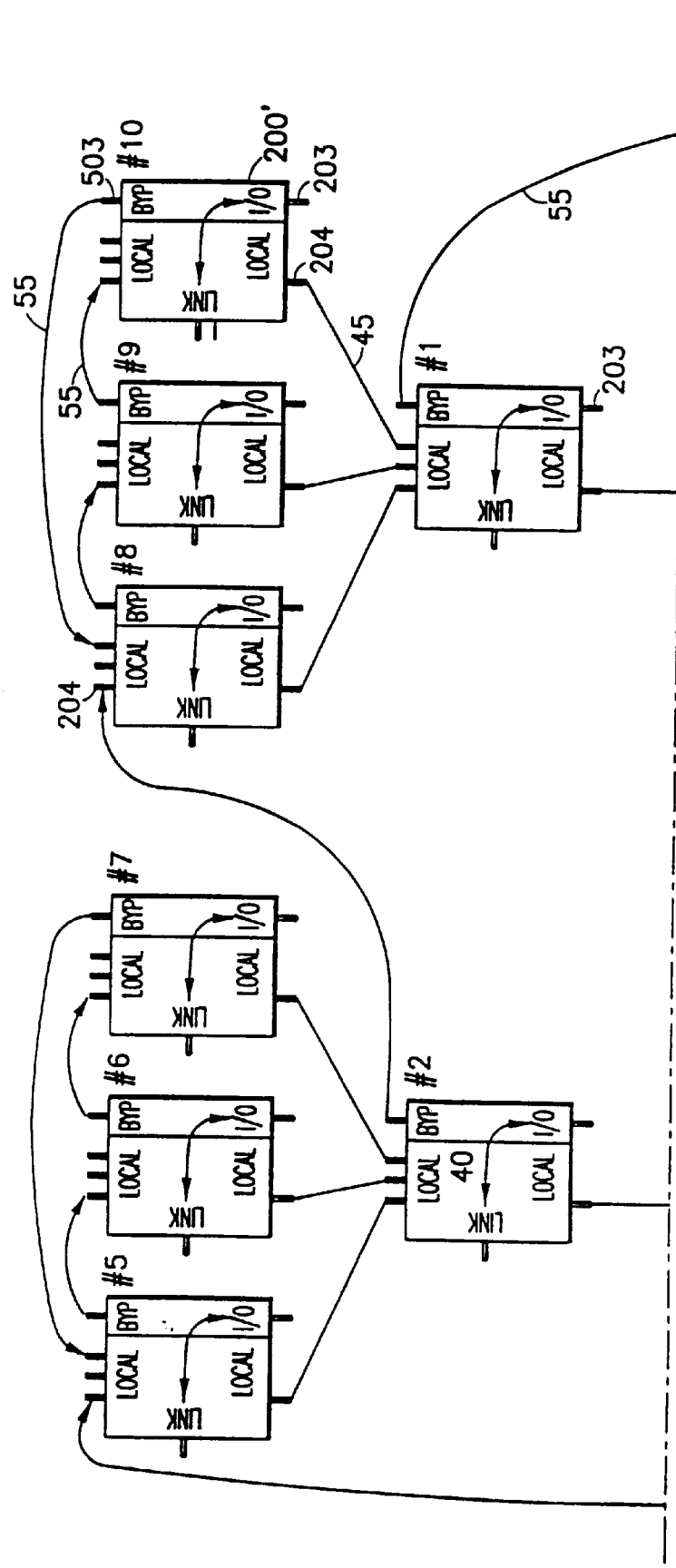
FIG. 9 shows the same tree configuration, in case of a failure of a line card, the dashed lines represent the route of the I/O of a failing line card #12 to the link of the spare card #0.
Figure 9B:
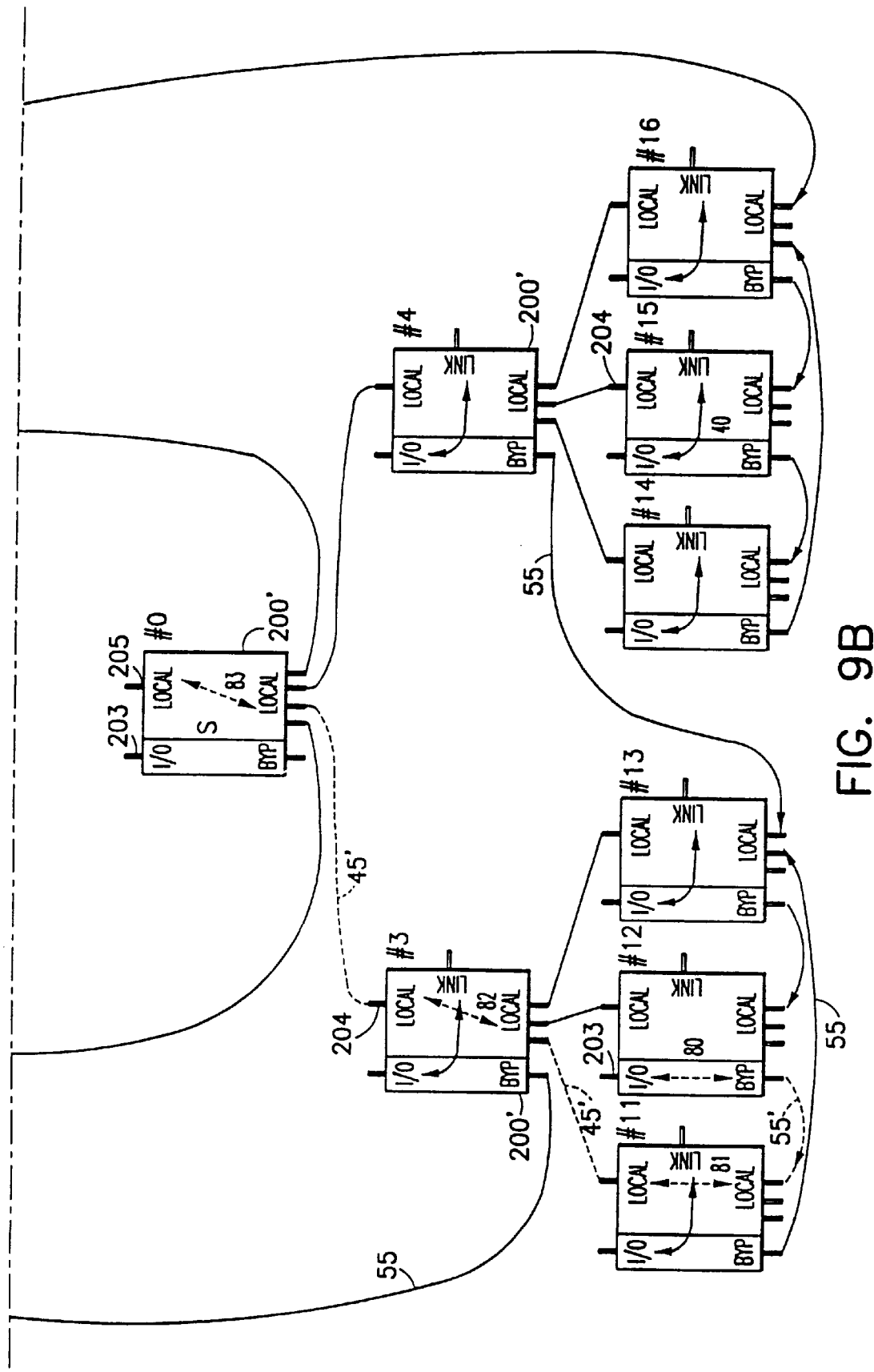

Referring to FIG. 8, our approach is to interconnect the line cards 200' to realize a network wherein there is a path from each line card to the spare line card using wires 45. This path may go through other line cards. In addition the bypass port 503 of any line card #i must be wired to a local port 204 of a card #j such that card #i is not in the path between card #j and the spare. Such a configuration is shown in FIG. 8 for the case N=17 and k=4. Here, for example, card #4 is bypassed to card #13, and the path from card #13 to card #0 (the spare) goes through card #3 but not card #4. In FIG. 9 when card #12 fails, its input is bypassed to card #3 via 80, 55' (to card #11), 81, 45' (to card #3), 82, 45' (to card #0) and eventually 83 the link port 205 of spare card #0.

In order to minimize the number of hops between a card and the spare, our preferred approach is to interconnect the line cards to realize a tree network of maximum degree k (using local port to local port wires 45). The designated spare line card is the root of the tree. It is hardwired to up to k other line cards. Each of these line cards is in turn hardwired to k−1 other line cards, until all the cards are interconnected in the configuration. Cards that are hardwired to a single other card via wires 45 (local port to local port) are termed "leaves". In FIG. 8, cards #5–#16 are leaves. If there are N line cards and 1 additional spare line card, then the height h (the maximum length path from a leaf to the root) of the tree connecting all the line cards is $$h = 1 + \log_{k-1}\left(N + 1 - \frac{2}{k}\right).$$

In addition, we hardwire the bypass port of each line card #i with a free local port of a line card #j (using a conection 55) so that:

j is a leaf in the tree (this is possible since the number of leaves in such a tree is always larger than the number of non-leaves), i does not lie on the path from 5 to the root. If i is a leaf card, it is possible to meet this requirement by defining a cycle of all leaves and hardwiring the bypass of each leaf to the next leaf on the cycle. If i is not a leaf, the requirement is met by hardwiring i to a leaf in another subtree of the root.

Generalizing the example in the beginning of this section, if a failure of a line card i occurs, the I/O is switched by its 501 switch via the bypass port 503 and wire 55 to the local port 204 of line card j. At j, it is switched by the 504 switch to the local port 204 hardwiring j it to its parent k in the tree. The 504 switch on k's line card is set to enable data transfer from i to k's parent and so forth, in order to realize a path from the I/O on line card i to the spare card at the root of the tree. This procedure is repeated at the other end of the faulty link, so that the data between the same I/O cards is now transffered via a different link port. The maximum number of cards required to participate in the rerouting of the failed channel is h+1.

Because of the line card modular strcuture, and because of the way that the bypass ports are wired in this embodiment, the failed link card 201' can be replaced without affecting any of the channels in the mux/demux unit. Observe that the maximum number of hops required to reroute a failed channel is h+1, where h is the height of the tree, computed above.

Two Failures—Dual Tree Configuration

If we designate two line cards as spare cards, we now create two k-degree trees $T_1$ and $T_2$, each with N/2 cards (assuming we have N line cards) and 1 spare, by hardwiring the local ports of the cards (wire 45) as described above. The height of each tree does not exceed $\log_{k-1} N$. The trees are interconnected at the leaf level in two ways: either a leaf is common to both trees or two leaves of the trees are hardwired to each other. This structure realizes a dual tree.

EXAMPLE 3

Figure 12B:
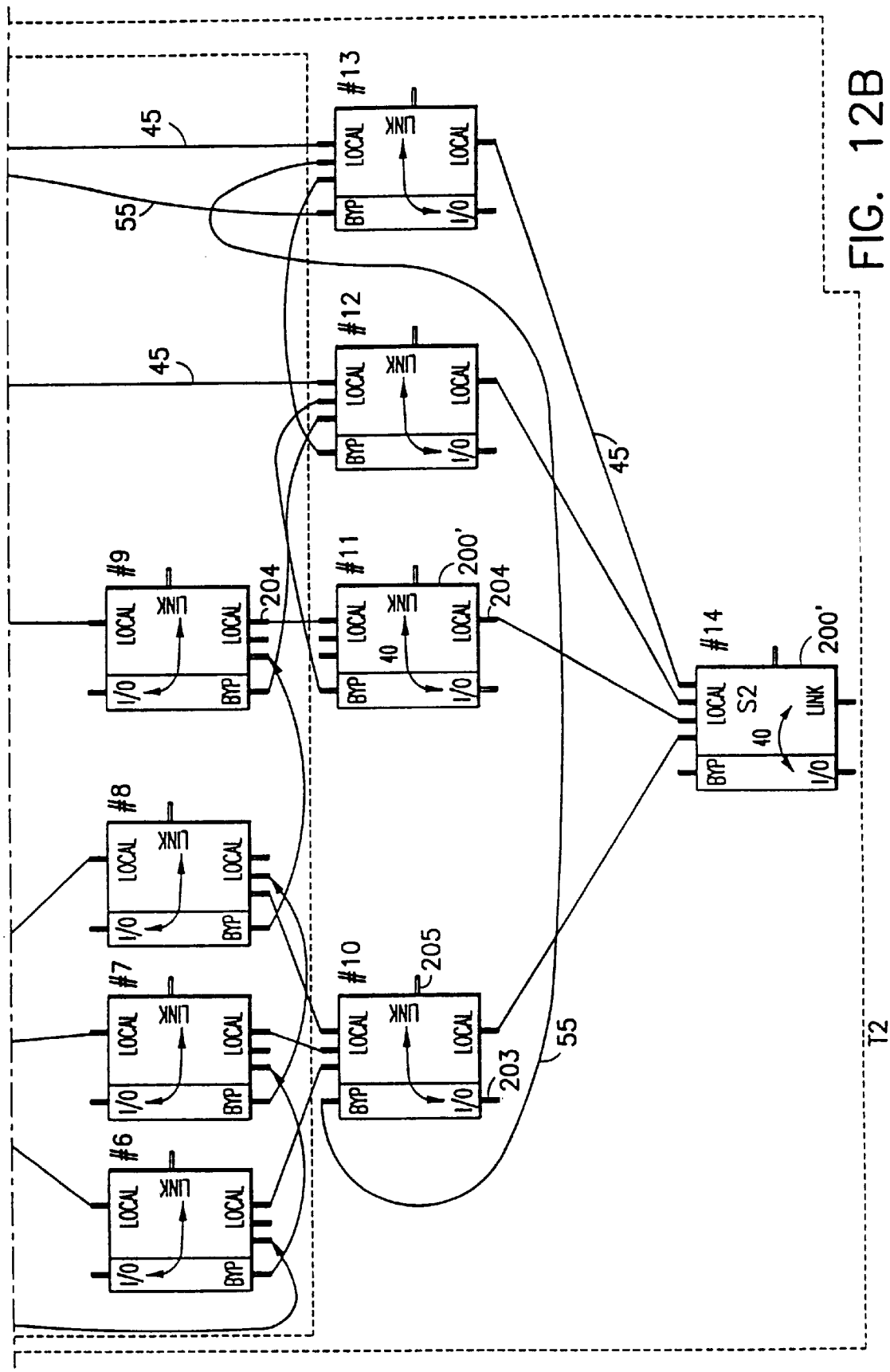
FIG. 12 shows the last configuration in FIG. 11 in detail, including the bypass wiring.

A dual tree configuration for interconnecting 12 line cards and 2 spare cards is shown in FIG. 12. In the figure we have T, rooted at card #1, which includes cards #2 to #9, and tree $T_2$ rooted at card #14, which includes cards #6 to #14. The trees are interconnected in both abovementioned ways: leaves #6 to #9 are common to both $T_1$ and $T_2$, while leaves #4 and #12 belong exclusively to $T_1$ and $T_2$ respectively, and are connected to each other. Leaves #5 and #13 are also connected to each other.

The transformations descibed below define the rules for hardwiring the local ports of the line cards to each other via wire 45, while requirements B1 and B2 described below and comments C2 and C3 define the rules for hardwiring the bypass ports to local ports via wire 55.

The following requirements are necessary in this embodiment to make sure that once an I/O of some card is bypassed to another card, it can reach a spare card, even if the link card 201 fails entirely (including its switching function):

(B1) The bypass of a leaf card i is not hardwired to a leaf j whose bypass is hardwired to i, and (B2) The bypass port of a card i is not hardwired to a leaf j whose path to a spare goes through i. More formally, if $L_i$ is the set of leaves of a tree whose path to the root goes through i, then $j \notin L_i$. In particular, a bypass port of card i is not hardwired to the same card i.

As explained below, this configuration is feasible with a switch degree of k>4. Furthermore, the above conditions ensures that, for any card i, if both i and the card to which i's bypass is hardwired, j, fail, at least one of them (namely j) will be successfully rerouted. At any other two failure scenario, both failures will be rerouted to the spares.

Figure 11:
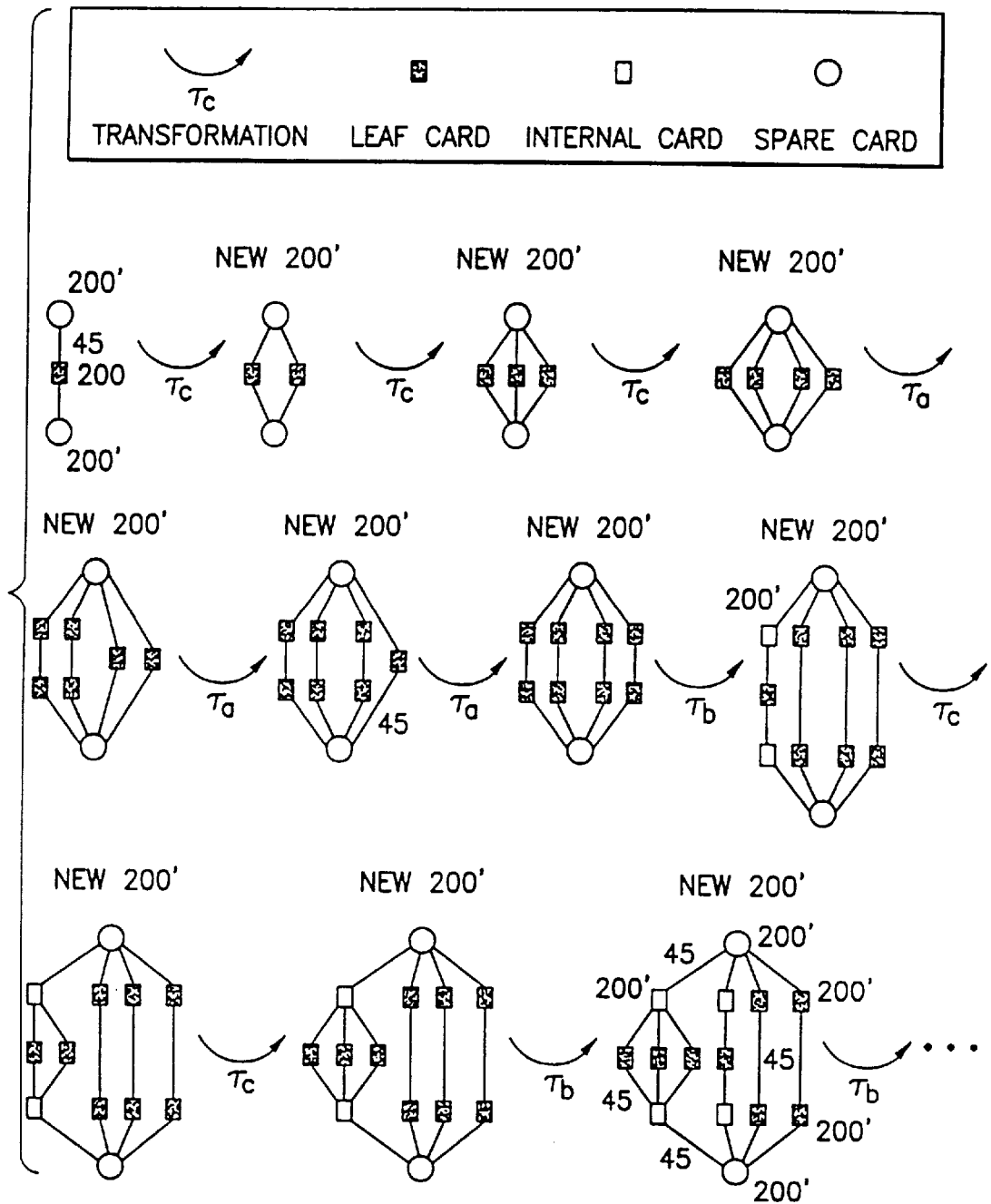
FIG. 11 shows an example for the growth of an initial configuration into a configuration of 12 line cards and two spare cards. The figure shows only the wiring between local ports.

The dual tree configuration is defined by a basic configuration of a single line card (plus two spares), and three transformations that gradually increase the number of cards in the configuration, one card at a time, as demonstrated in FIG. 11, up to any desired number of line cards N.

Basic Configuration.

The basic configuration is composed of a single leaf card (depicted as a full box), hardwired to the two spares (depicted as circles), see FIG. 10A.

Transformations.

The basic configuration is extended one card at a time, by applying one of the transformations in FIG. 10B. In the figure, a transformation is depicted by an arrow, the spare cards are depicted as circles, line cards which are leaves are depicted as full boxes, while line cards that are non-leaves (termed internal line cards) are depicted as empty boxes. The transformations are applied in the following order: (1) $\tau_c$, (2) $\tau_a$, (3) $\tau_b$. Hence, transformations of type $\tau_c$ are applied whenever possible, only if no such transformations are possible, then $\tau_b$ is performed, and only if no transformations $\tau_c$, $\tau_b$ are applicable, is a $\tau_a$ transformation applied.

Henceforth, the distance relating terms ("distance", "far" etc.) will refer to the number of hops (or line cards) between a pair of line cards. The transformations are fully described by the following table, in which "Ord" stands for the order in which transformations are applied, "Card" stands for the increase in the total number of line cards in the configuration resulting from the transformation, and "Dist" for the maximal increase in the maximum distance from a leaf to a spare card. The numbers in the table refer to FIG. 10, in which the new card which is the outcome of the transformation is marked by "new 200'".

with subtrees of equal size, except for at most one single subtree, this is feasible for most $S_i$. Assume $S_j$ is the only smaller sub-tree. Then some set X of cards in $S_{j-1}$ cannot be hardwired to leaves of $S_j$. However, some set Y of the leaves in $S_{j+1}$ is not mapped to by the (fewer) cards in $S_j$. Hence, it is possible to hardwire the bypass ports of cards in X to the free ports of the leaves in Y.

The above description translates into the following algorithm, which, in conjunction with the description in the above table, is sufficient for a programmer to code on any processor, such as a Pentium:

Construct the dual-tree:
  WHILE NumOfCards<N
    IF $\tau_c$ can be applied THEN apply it

| Trans. | Refer to | Ord | Precondition | Description | Card | Leaf | Dist |
|---|---|---|---|---|---|---|---|
| $\tau_a$ | FIG. 10B | 2 | (1) A single leaf #1 is hardwired to two internal or spare cards (wires 45a and 45b). (2) Any other leaf χ satisfying precondition 1 must be at least as far from the furthest spare. | Disconnect card #1 from 45b, add a new card 200', hardwire it to card #1 by a wire 45, and hardwire the new card to the wire 45b. | +1 | +1 | +1 |
| $\tau_b$ | FIG. 10C | 3 | Two leaf cards #1 and #2 are hardwired connected to each other (wire 45c). | Insert a new leaf card #3 between cards #1 and #2 (mutual to both trees), by disconnecting wire 45c, and hardwiring card #3 to both #1 and #2 by wire 45. Cards #1 and #2 are now non-leaves. | +1 | −1 | +0 |
| $\tau_c$ | FIG. 10D | 1 | There exist two internal cards, #1 ∈ $T_1$ and #2 ∈ $T_2$, that are interconnected by less than κ − 1 leaves (the number of cards as #3 is less than κ − 1). | Hardwire a new leaf card to both #1 and #2 using wire 45. | +1 | +1 | +0 |

The feasiblity of the construction is made possible by the following comments:

(C1) Since bypass ports are hardwired to ports of leaves only (by means of wire 55), there have to be enough leaves after each transformation, to support connections from all cards to their free ports. Note that each leaf has k−1 free ports (since it always has two connections to other cards). Thus, if k≧4, transformations $\tau_a$ and $\tau_c$ only enlarge the number of free ports (since only one card is added, and k−2>1 free ports are added). The only case which may deem the solution infeasible is transformation $\tau_b$, which decreases the number of available bypass ports at the leaves, while increasing the number of total cards. This is taken care of by the precedence order of the transformations, which ensures that $\tau_b$ only takes place when there are extra ports at the leaves, to support the bypass connections.

(C2) Complying with requirement B1 (See above) is easy if there are more than 2 leaves (and impossible otherwise): Connect the leaves in one big cycle. After this, each leaf still has at least one free port.

(C3) To comply with requirement B2 (See above), arrange the subtrees headed by the children of the root in a cyclic order ($S_0$, $S_1$, . . . , $S_k$, where each $S_i$ is a subtree). Then, hardwire the internal nodes of $S_i$ to the free ports in the leaves of $S_{i+1}$ (all calculations are modulo k+1). Since the transformation precedence order above creates a dual tree ELSE IF $\tau_a$ can be applied THEN apply it
      ELSE apply $\tau_b$
  Connect the bypass ports:
    (1) Of leaf cards to other leaf cards in one cycle
    (2) Of inner cards to the remaining ports of leaf cards (see above).

EXAMPLE 4

A detailed dual tree configuration for interconnecting 12 link cards to two spares is shown in FIG. 12. The figure depicts in detail the last configuration from FIG. 11. FIG. 11 depicts all the intermediate configurations, starting from a basic 3 card configuration. In each stage, the arrows in FIG. 11 are tagged by the transformation from FIG. 10 that was used. While the wires 55 are not depicted in FIG. 11, they appear in FIG. 12 as unidirectional arrows from the bypass port to the local port. As may be verified by matching the card numbers of FIG. 12 and the full boxes in FIG. 11, the leaf cards are #4 to #9 and #12 to #13. To comply with requirement B1, their wires 55 connect them in a cycle: #5→#4→#6→#7→#8→#9→#12→#13→#5. Also, to comply with requirement B2, the bypass of an internal card is hardwired to a leaf node in a different subtree. For example, the bypass port of card #2 cannot be hardwired to leaf cards #6 to #8, but can be hardwired to any other leaf card because the other leaf cards are in different subtrees from that of card #2. Specifically, card #2 is hardwired to leaf card #5.

When up to two line cards $f_1$ and $f_2$ fail, the controller unit 209 computes the shortest paths $p_{i,j}$ between said failed line card $f_i$ and spare card $s_j$ (where i=1.2, j=1.2), and finds if $p_{1,1}$ and $p_{2,2}$ have a common wire or pass through one of the failed cards. In such a case, the controller modifies the switch interconnections along $p_{1,2}$ and $p_{2,1}$ so as to enable the I/O of $f_1$ to reach the link port of $s_2$ and the I/O of $f_2$ to reach the link port of $s_1$. Otherwise, the controller modifies the switches along $p_{1,1}$ and $p_{2,2}$ so as to enable the I/O of $f_1$ to reach the link port of $s_1$ and the I/O of $f_2$ to reach the link port of $s_2$.

REFERENCES

[1] F. J. Janniello, R. A. Neuner, R. Ramaswami, and P. E. Green, "Multi-protocol optical fiber multiplexer for remote computer interconnection," in *OFC'95 Tech. Digest*, 1995.

[2] F. J. Janniello, R. A. Neuner, R. Ramaswami, and P. E. Green, "A multi-protocol optical fiber multiplexer for remote computer interconnection," tech. rep., IBM Research Report, 1995.

[3] J. Y. Hui, *Switching and Traffic Theory For Integrated Broadband Networks*. Kluwer Academic Publishers, 1990.

Having thus described our invention, what we claim as new and desire to secure by Letters Patents is:

1. In a multichannel communications system having N channels with N line cards connected to a transmission medium of said system, a method of rerouting a channel upon detection of a failed line card in the N line cards, said method comprising:
   (a) partitioning said line cards into an integer number i of groups of size at most $k_i+1$, where each group has a spare line card, and wherein said spare line card has at least an integer number $k_i$ of spare line card local ports and a spare line card link port;
   (b) for each line card in a predetermined group that is not a spare line card, connecting each line card in said predetermined group to an individually assigned spare line card local port in said predetermined group; and
   (c) upon detection of a failed line card in said predetermined group, said failed line card including a failed line card I/O port and a failed line card local port, rerouting said failed line card I/O port through said failed line card local port to said assigned spare line card local port, then to said spare line card link port in said predetermined group.

2. A method according to claim 1, wherein each line card including said spare line card has $k_i$ local ports.

3. A method according to claim 1, wherein the partitioning step comprises partitioning the line cards into at least first and second groups of line cards, and wherein $k_1$ is different than $k_2$.

4. A method according to claim 1, wherein all $k_i$ are equal and N is an integer multiple of $(k_i+1)$.

5. A multichannel communications subsystem having a plurality of channels, the subsystem comprising:
   N line cards partitioned into an integer number i of groups of line cards of size at most $k_i+1$, each group including an integer number $k_i$ of non-spare line cards and a spare line card comprising at least $k_i$ spare line card local ports and a spare line card link port, one of said N line cards to be a subsequently determined failed line card having a failed line card local port and a failed line card I/O port;
   a signal connection between a local port of each non-spare line card in a predetermined group to an individually assigned spare line card local port; and
   a first switch in said subsequently determined failed line card in said predetermined group for rerouting the failed line card I/O port in said predetermined group through said failed line card local port to the spare line card in said predetermined group upon a determination of one of said N line cards as said subsequently determined failed line card in said predetermined group.

6. The multichannel communications subsystem of claim 5 wherein the first switch redirects the failed line card I/O port through said failed line card local port to its assigned spare line card local port.

7. The multichannel communications subsystem of claim 6, further comprising a second switch in the spare line card in said predetermined group for rerouting the spare line card local port connected to said failed line card to the spare line card link port.

8. The multichannel communications subsystem of claim 5 wherein each non-spare line card has $k_i$ local ports.

9. The multichannel communications subsystem of claim 5, wherein all $k_i$ are equal and N is an integer multiple of $k_i+1$.

10. The multichannel communications subsystem of claim 5, wherein the N line cards are partitioned into at least first and second groups of line cards, and wherein $k_1$ is different than $k_2$.

11. The multichannel communications subsystem of claim 7, wherein the N line cards are partitioned into at least first and second groups of line cards, wherein $k_1$ is different than $k_2$, and wherein the second switch in the spare line card for group number 1 is a $1 \times (k_1+1)$ switch and the second switch in the spare line card for group number 2 is a $1 \times (k_2+1)$ switch.

12. The multichannel communications subsystem of claim 5, further comprising a transmission medium coupled to the N line cards.

13. The multichannel communications subsystem of claim 7, wherein the second switch in the spare line card for said group number i is a $1 \times (k_i+1)$ switch.

14. A multichannel communications subsystem having a plurality of channels, the subsystem comprising:
   N line cards partitioned into an integer number i of groups of line cards of size at most $k_i+1$, each group including $k_i$ non-spare line cards and a spare line card comprising at least an integer number $k_i$ of spare line card local ports and a spare line card link port, one of said N line cards to be a subsequently determined failed line card having a failed line card local port and a failed line card I/O port;
   a signal connection means for connecting a local port of each non-spare line card in a predetermined group to an individually assigned spare line card local port in said predetermined group; and
   first switch means in said subsequently determined failed line card in said predetermined group for rerouting the failed line card I/O port in said predetermined group through said failed line card local port to the spare line card in said predetermined group upon a determination of one of said N line cards as said subsequently determined failed line card in said predetermined group.

15. The multichannel communications subsystem of claim 14 wherein the first switch means redirects the failed line card I/O port through said failed line card local port to its assigned spare line card local port.

16. The multichannel communications subsystem of claim 15, further comprising a second switch means in the spare line card in said predetermined group for rerouting the spare line card local port connected to said failed line card to the spare line card link port.

17. The multichannel communications subsystem of claim 16 wherein the second switch means is a $1\times(k_i+1)$ switch.

18. The multichannel communications subsystem of claim 14 wherein each non-spare line card has $k_i$ local ports.

19. The multichannel communications subsystem of claim 16, wherein the first and second switch means are $1\times(k_i+1)$ switches.

20. The multichannel communications subsystem of claim 14, wherein all $k_i$ are equal and N is an integer multiple of $k_i+1$.

21. The multichannel communications subsystem of claim 14, wherein the N line cards are partitioned into at least first and second groups of line cards, and wherein $k_1$ is different than $k_2$.

22. The multichannel communications subsystem of claim 16, wherein the N line cards are partitioned into at least first and second groups of line cards, wherein $k_1$ is different than $k_2$, and wherein the second switch means in group number 1 is a $1\times(k_1+1)$ switch and the second switch means in group number 2 is a $1\times(k_2+1)$ switch.

23. The multichannel communications subsystem of claim 14, further comprising a transmission medium coupled to the N line cards.

\* \* \* \* \*

UNITED STATES PATENT AND TRADEMARK OFFICE
CERTIFICATE OF CORRECTION

PATENT NO.     : 6,256,293 B1
DATED          : July 3, 2001
INVENTOR(S)    : Ornan Gerstel, William Hall, Rajiv Ramaswami and Galen Sasaki It is certified that error appears in the above-identified patent and that said Letters Patent is hereby corrected as shown below:

Column 5,
Line 22, the letter "z" should be "i".

Column 6,
Line 8, the word "so" should be "$s_0$".

Signed and Sealed this

Second Day of April, 2002

Attest:

JAMES E. ROGAN
Attesting Officer    Director of the United States Patent and Trademark Office